United States Patent
Gorajala Chandra et al.

(10) Patent No.: US 9,986,387 B2
(45) Date of Patent: May 29, 2018

(54) ASSOCIATING POSITION INFORMATION COLLECTED BY A MOBILE DEVICE WITH A MANAGED NETWORK APPLIANCE

(71) Applicant: Fortinet, Inc., Sunnyvale, CA (US)

(72) Inventors: Sekhar Sumanth Gorajala Chandra, Milpitas, CA (US); Sashidhar V. Annaluru, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days. days.

(21) Appl. No.: 14/950,015

(22) Filed: Nov. 24, 2015

(65) Prior Publication Data

US 2017/0150322 A1   May 25, 2017

(51) Int. Cl.
*H04W 4/00* (2018.01)
*H04W 4/04* (2009.01)
*G06K 7/14* (2006.01)

(52) U.S. Cl.
CPC ............ *H04W 4/04* (2013.01); *G06K 7/1413* (2013.01)

(58) Field of Classification Search
USPC ................. 455/456.3; 370/12.12; 348/159; 358/302
See application file for complete search history.

(56) References Cited

U.S. PATENT DOCUMENTS

| | | | |
|---|---|---|---|
| 8,681,759 B2 * | 3/2014 | Kholaif | H04W 48/16 370/338 |
| 9,578,503 B2 * | 2/2017 | Xue | G06F 17/30725 |
| 2003/0117658 A1 * | 6/2003 | Takenaga | G01C 21/20 358/302 |
| 2003/0229549 A1 * | 12/2003 | Wolinsky | G06Q 30/0248 705/14.61 |
| 2005/0021980 A1 * | 1/2005 | Kanai | G06F 21/608 713/182 |
| 2007/0171091 A1 * | 7/2007 | Nisenboim | G08C 17/00 340/12.24 |
| 2009/0022397 A1 * | 1/2009 | Nicholson | G06K 9/40 382/180 |
| 2011/0022661 A1 * | 1/2011 | Alsina | G06Q 10/109 709/205 |
| 2011/0252130 A1 * | 10/2011 | Karaoguz | H04L 41/0853 709/224 |

(Continued)

OTHER PUBLICATIONS

Nikktech.com, "Devolo dLAN 500 AV Wireless+ Starter Kit Review" Jan. 14, 2014.*

(Continued)

*Primary Examiner* — William D Cumming
(74) *Attorney, Agent, or Firm* — Hamilton, DeSanctis & Cha LLP

(57) ABSTRACT

Systems and methods for obtaining and managing network appliance position information are provided. According to one embodiment, a network appliance controller establishes a network connection with a mobile device. The network appliance controller receives via the network connection from the mobile device identification information associated with a network appliance and position information. The network appliance controller associates the identification information with the position information as a deployment position of the network appliance within the wireless local area network (WLAN).

15 Claims, 8 Drawing Sheets

(56) References Cited

U.S. PATENT DOCUMENTS

| | | | |
|---|---|---|---|
| 2013/0103939 A1* | 4/2013 | Radpour | H04L 9/083 713/152 |
| 2014/0354779 A1* | 12/2014 | Cho | H04N 13/0296 348/47 |
| 2014/0375819 A1* | 12/2014 | Larsen | G08B 13/196 348/159 |
| 2017/0150322 A1* | 5/2017 | Gorajala Chandra | H04W 4/04 |
| 2018/0005088 A1* | 1/2018 | Farfade | G06K 9/6297 |

OTHER PUBLICATIONS linet.net.au, "General NBN Wireless router setup advice" 2014.*
Kitz.co.uk, "Inside the BT Business Hub 3.0" Mar. 20, 2012.*

* cited by examiner

ASSOCIATING POSITION INFORMATION COLLECTED BY A MOBILE DEVICE WITH A MANAGED NETWORK APPLIANCE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2015, Fortinet, Inc.

BACKGROUND

Field

Embodiments of the present invention generally relate to the field of wireless networks. In particular, various embodiments relate to obtaining positioning information of managed network appliances via a mobile device to facilitate proper channel utilization, maintenance planning and debugging by a wireless access point controller in a large wireless local area network (WLAN) environment.

Description of the Related Art

Wireless access points (APs) are deployed to cover public areas, offices, enterprise campuses, households and the like so that Wi-Fi-enabled devices may be connected to a private network or the Internet through a wireless network. When a large number of APs are deployed in an enterprise network, the wireless APs are connected to a wireless access point controller (AC) and are managed by the AC. The AC may also be a cloud-based AC that manages APs across the Internet. Some wireless network planning tools, such as Fortinet's FortiPlanner software, have been introduced to facilitate planning of wireless networks. The planning tools may import a floor-plan of a building, draw in obstructions, select the type of APs and automatically calculate the number and placement of APs. The tools may use sophisticated signal propagation ray tracing algorithms to estimate signal loss and bounce based on objects that can cause radio frequency interference, such as walls, windows and elevator shafts. The planning tools may select various deployment scenarios such as Voice over Internet Protocol (VoIP), high priority data or normal, to ensure adequate wireless Local Area Network (LAN) coverage and prepare a plan including the number and placement of APs within the venue at issue. When a large number of APs are deployed pursuant to a particular plan, it is not easy for the AC to collect information about which AP is deployed at a particular position. In addition, the positions where APs are actually deployed may differ slightly from the planned positions and it is not easy to collect the actual positions of the APs. For a cloud-based AC, the position information of APs that are managed by the cloud-based AC is usually input manually. The administrator of the AC may place pins on a map to indicate positions of APs. However, the positions indicated by the pins may also differ from the actual positions of the APs.

For better management of APs, an AC needs the position information, such as the global positioning system (GPS) coordinates or relative coordinates, of each AP that is managed by the AC. With the position information of APs, a planning tool of the AC may optimize coverage solutions, optimize channel utilization and maintain and debug deployments of APs. The AC may also triangulate the WiFi clients' locations if position information for the managed APs is available. The AC may support auto-provisioning based on the location or country of the APs. The position information of APs is also very useful in identifying a faulty AP by its location, altitude, terrain etc. Actual deployment positions of the network appliances, including, but not limited to APs, are also valuable for inventory management of the network. Therefore, there is a need for efficiently collecting and managing position information of network appliances by network controllers.

SUMMARY

Systems and methods are described for obtaining and managing network appliance position information. According to one embodiment, a network appliance controller of a wireless local area network (WLAN) establishes a network connection with a mobile device. The network appliance controller receives via the network connection from the mobile device identification information associated with a network appliance and position information. The network appliance controller associates the identification information with the position information as a deployment position of the network appliance within the wireless local area network (WLAN).

In another embodiment, a network appliance controller of a wireless local area network (WLAN) receives a digital image containing identification information of a network appliance. The network appliance controller extracts the identification information from the digital image and extracts shooting position information from the digital image. The network appliance controller associates the identification information with the shooting position of the digital image as the deployment position of the network appliance within the WLAN.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
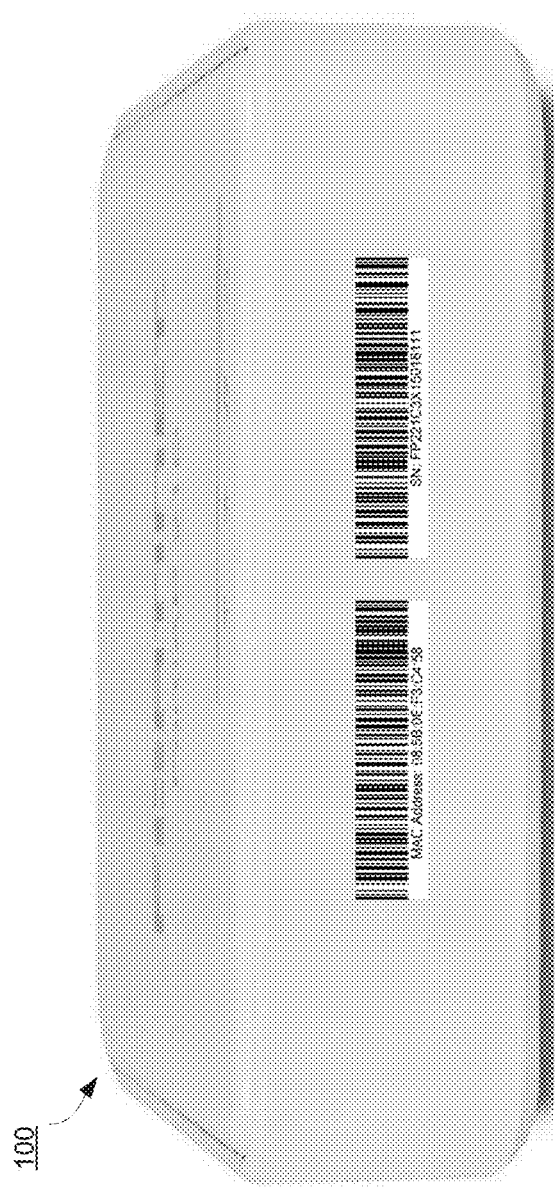
FIG. 1 illustrates an exemplary network appliance with barcode labels in accordance with an embodiment of the present invention.

Systems and methods are described for associating positioning information collected by a mobile device with a managed network appliance. In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Notably, while embodiments of the present invention may be described using modular programming terminology, the code implementing various embodiments of the present invention is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

If the specification states a component or feature "may", "can", "could", or "might" be included or have a characteristic, that particular component or feature is not required to be included or have the characteristic.

The phrase "security device" generally refers to a hardware device or appliance configured to be coupled to a network and to provide one or more of data privacy, protection, encryption and security. The network security device can be a device providing one or more of the following features: network firewalling, virtual private network (VPN), antivirus, intrusion prevention (IPS), content filtering, data leak prevention, antispam, antispyware, logging, reputation-based protections, event correlation, network access control, vulnerability management. Load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The term "cloud" generally refers to a public or private cloud infrastructure that delivers one or more services over a network (e.g., the Internet). Typically, the computer resources (hardware and software) of a cloud are hosted by a third party (the cloud provider). Examples of services that may be provided by a cloud include, but are not limited to, infrastructure, platform, software, network, storage, data, database, security, etc.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

FIG. 1 illustrates an exemplary network appliance 100 in accordance with an embodiment of the present invention. In the present example, one or more barcode labels are placed on a housing of network appliance 100 when it is assembled by a manufacturer. The barcode may be an optical machine-readable representation, such as a linear barcode or a matrix barcode. The barcode may contain an identification of network appliance 100, such as a unique serial number and/or media access control (MAC) address of network appliance 100.

In one example, a mobile device (e.g., a smartphone, a tablet computer or the like) (not shown) with an optical barcode reader and/or a camera may be placed near network appliance 100 and scan the barcode. Data encoded by the barcode, (e.g., the identification of network appliance 100) is decoded by a barcode decode engine of the mobile device. The current position of the mobile device is also captured by the mobile device. The identification of network appliance 100 and the current position of the mobile device are transferred from the device to a network appliance controller (not shown). As the mobile device is placed near network appliance 100 when scanning the barcode, the current position of mobile device is a reasonable approximation of the deployment position of network appliance 100. Therefore, the network appliance controller may associate the current position of the mobile device with the network appliance as the deployment position of the network appliance.

In another example, a mobile device with a camera may be placed near network appliance 1000 and a photo of the barcode label of the network appliance may be taken. When a digital image file of the barcode label is created, the shooting position is captured by the mobile device and stored as meta-data of the digital image file. The digital image file of barcode label is then transferred to the network appliance controller. The network appliance controller may decode the data encoded by the barcode and extract the identification of network appliance 100. The shooting position information may also be extracted from the meta-data associated with the digital image. As the shooting position of the digital image is near network appliance 100, the network appliance controller may associate the identification of the network appliance and the shooting position of the digital image and use the shooting position as the deployment position of network appliance 100.

Figure 2:
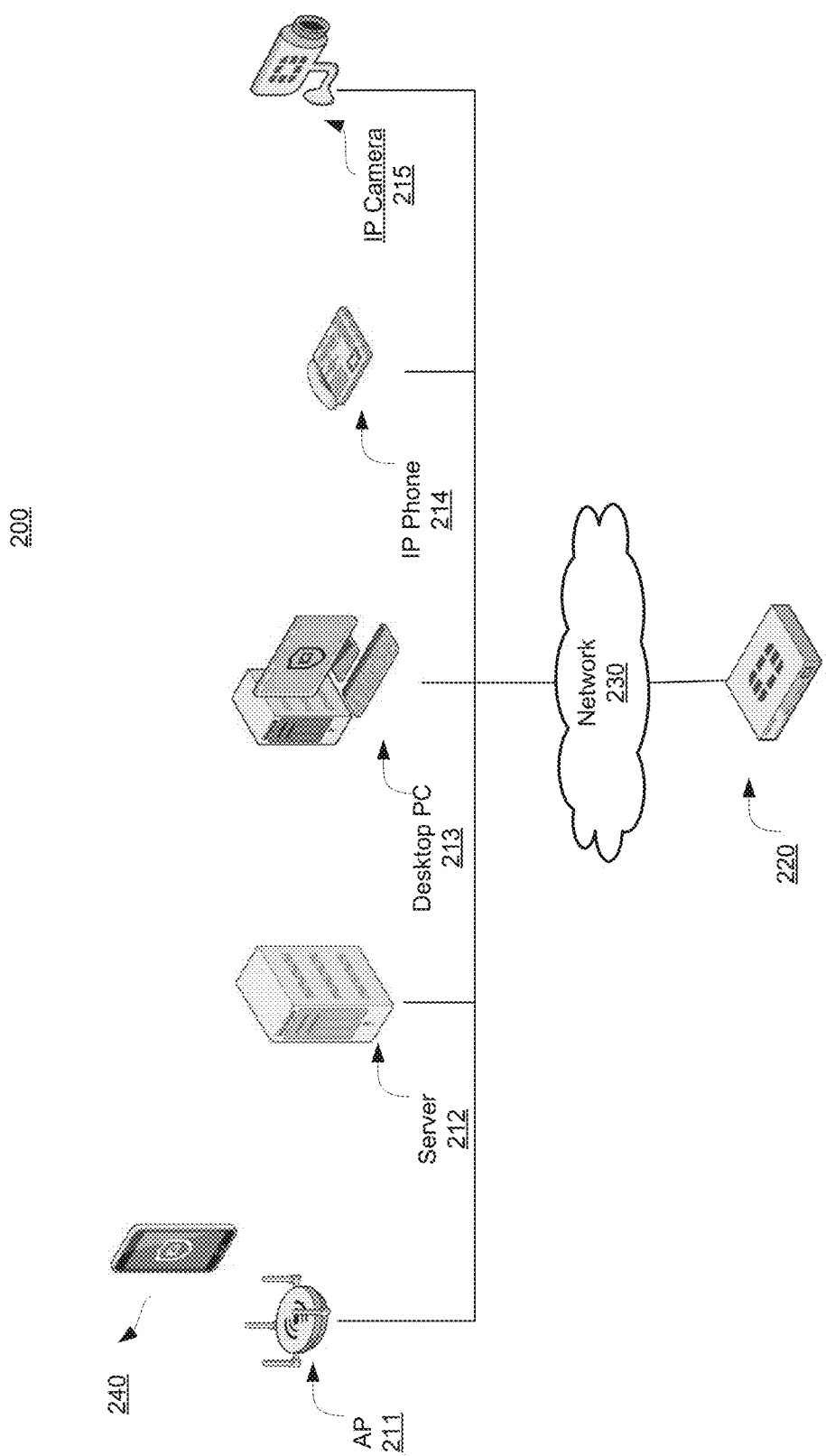
FIG. 2 illustrates an exemplary network architecture in accordance with an embodiment of the present invention.

FIG. 2 illustrates an exemplary network architecture 200 in accordance with an embodiment of the present invention. According to the present example, network architecture 200 includes multiple network appliances, such as an AP 211, a server 211, a desktop PC 213, an IP phone 214, and an IP camera 215. A barcode label with an identification, such as serial number and/or a MAC address of the device is attached to each of network appliances 211-215 as shown in FIG. 1. Network appliances 211-215 may be deployed at fixed positions and may be connected to a network appliance controller 220 through a network 230. Network 230 may be any type of network, such as a local area network (LAN), a wireless LAN, a wide area network (WAN), or the Internet.

Mobile device 240 is a portable (and potentially, also wireless) device that is integrated or equipped with a positioning system that is capable of capturing the current position of mobile device 240. The positioning system may be a satellite-based global positioning system (GPS) that provides global 2-dimensional (2D) or 3-dimensional (3D) position information. The positioning system may also be a wireless-based positioning system that may provide relevant position or global position based upon wireless signal measurements of mobile device 240. In one example, mobile device 240 may be a smartphone or a tablet equipped with a camera or a digital camera and also equipped with a GPS module. In another example, mobile device 240 may be a digital camera with a GPS module. Mobile device 240 may be carried to places near network appliance 211-215 and take pictures of barcode labels of network appliances 211-215. When pictures are shot, mobile device 240 may capture the current positions of the pictures by its GPS module. The current positions of pictures may be recorded at Exchangeable image file format (Exif) meta-data of the digital image files. Then, the digital images of barcodes of network appliances 211-215 may be transferred to network appliance controller 220 by electronic mail (email), file transfer protocol (FTP), Hypertext Transfer Protocol (HTTP), instant messaging (IM) or similar protocols, tools or electronic file communication method. A memory card on which the digital images are stored may also be physically read by an intermediate device that transfers the digital images to network appliance controller 220 or the memory card may be read directly by inserting it into an appropriate memory card slot of network appliance controller 220.

Network appliance controller 220, in one example, may be an AC, e.g., a FortiAC access controller available from the assignee of the present invention, which manages APs across the network. The AC may need position information of the APs in order to facilitate optimizing of wireless networks or triangulate the WiFi clients' locations based on the positions of APs. In another example, network appliance controller 220 may be an asset management device, e.g., a FortiMonitor asset management device available from the assignee of the present invention, that collects information, that may include, but is not limited to, locations, hardware configurations, operating systems, installed applications of assets of a private network. In a further example, network appliance controller 220 may be a network security device, e.g., a FortiGate network gateway available from the assignee of the present invention, that is deployed at the edge of a private network and used for protecting the private network from viruses, malware, data leakage and other attacks. In a further example, network appliance controller 220 may be a cloud-based service, e.g., a FortiCloud cloud-based service or a FortiGuard service that provides logging, device management and/or network security service to other network security appliances that subscribe to corresponding services.

After a digital image of barcode of a network appliance is received by network appliance controller 220, the data encoded by barcode may be decoded by a barcode decoder of network appliance controller 220. Then, network appliance controller 220 may also extract position information of the picture from the Exchangeable image file format (Exif) meta-data of the image file, for example. Network appliance controller 220 may verify whether the serial number and/or MAC address decoded from the barcode are valid. For example, if the serial number or MAC address belongs to a network appliance that is managed by the network appliance controller 220 and the image file is from a valid user or source, network appliance controller 220 may associate the network appliance with the position of the picture as the deployment position of the network appliance. The deployment position of network appliance may be stored at network appliance controller 220 and may subsequently be used in connection with management of the network appliance.

Figure 3:
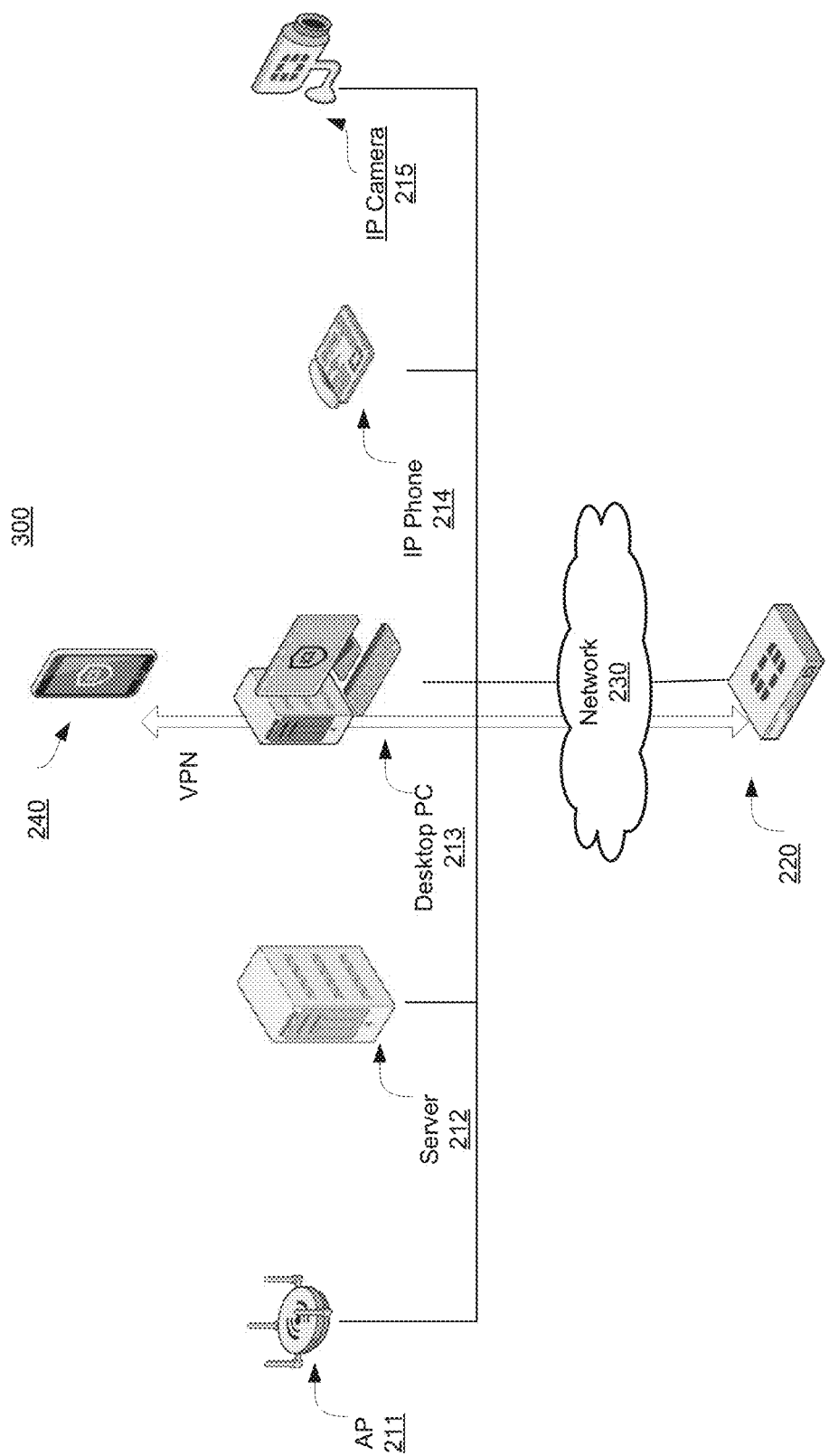
FIG. 3 illustrates an exemplary network architecture in accordance with another embodiment of the present invention.

FIG. 3 illustrates an exemplary network architecture 300 in accordance with another embodiment of the present invention. In the present example, the deployment of network architecture 300 is the same as network architecture 200 of FIG. 2; however, the process of associating position information captured by mobile device 240 with a network appliance 211-215 by network appliance controller 220 is different from that employed in connection with network architecture 200 of FIG. 2.

In one example, a network connection, such as a Virtual Private Network (VPN) tunnel, may be established between mobile device 240 and network appliance controller 220 so as to facilitate secure transfer of data (e.g., decoded or encoded barcode data, digital image files, associated meta-data and/or position information) to network appliance controller 220. In one embodiment, before the VPN tunnel is established, a user of mobile device 240 is authenticated by network appliance controller 220 to verify that information collected by mobile device 240 is from a trusted source.

After the VPN tunnel is established, mobile device 240 is placed near a network appliance 211-215. Then, mobile device 240 may scan a barcode label associated with network appliance 211-215 and a serial number and/or a MAC address of network appliances 211-215 may be decoded from the barcode. The current position of mobile device 240 may also be captured by a GPS module associated with or incorporated within mobile device 240. The identification information of network appliance 211-215 together with current position information of mobile device 240 may be then transferred to network appliance controller 220 through the VPN tunnel. Network appliance controller 220 may verify whether the identification information supplied by mobile device 240 is a valid serial number and/or a valid MAC address and associate the identification information of the network appliance with the position of the mobile device 240 as the deployment position of the network appliance. The deployment position of network appliance may be stored at network appliance controller 220.

In another example, mobile device 240 may capture identification information associated with a network appliance, such as AP 211, by wireless communication with network appliance 211 instead of scanning a barcode label placed on network appliance 211. In this example, AP 211 may be provided with a basic service set identifier (BSSID) that may be a MAC address of AP 211. AP 211 may periodically broadcast its BSSID to allow it to be observed by WiFi clients. Continuing with the present example, mobile device 240 may be positioned proximate to AP 211. Then, mobile device 240 may capture the BSSID of AP 211. After BSSID of AP 211 is acquired by mobile device 240, mobile device 240 may capture its current position by the GPS module. The BSSID of AP 211 and the current position of mobile device 240 may then be transferred to network appliance controller 220. Finally, network appliance controller 220 may associate the captured BSSID with the current position as the deployment position of AP 211. When BSSIDs of multiple APs are scanned by mobile device 240 at a position, the BSSID with the strongest signal strength may be selected and transferred to network appliance controller 220.

In a further example, AP 211 may be assigned a unique service set identifier (SSID) by an administrator of a private network. The unique SSID may be periodically broadcast by AP 211. Mobile device 240 may be placed in proximity to the AP 211 and scan the unique SSID of AP 211. The unique SSID of AP 211 and a current position of mobile device 240 may be transferred to network appliance controller 220. The AP 211 may be identified by the unique SSID by the network appliance controller and the current position of mobile device 240 may be associated with AP 211.

Figure 4:
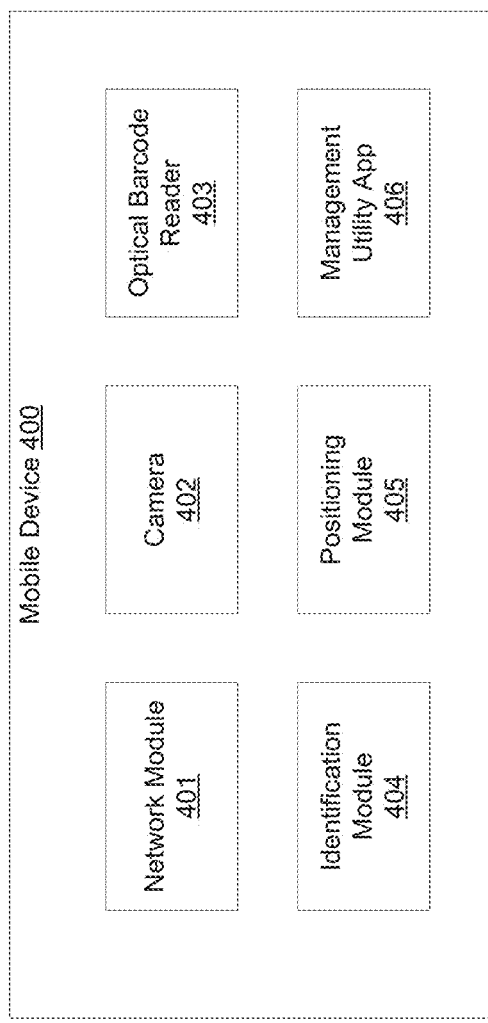
FIG. 4 illustrates exemplary functional units of a mobile device that provides position information of a network appliance to a network appliance controller in accordance with an embodiment of the present invention.

FIG. 4 illustrates exemplary functional units of a mobile device 400 that provides position information of a network appliance to a network appliance controller in accordance with an embodiment of the present invention. In this example, mobile device 400 includes a network module 401, a camera 402, an optical barcode reader 403, an identification module 404, a positioning module 405 and a management utility application 406.

Figure 5:
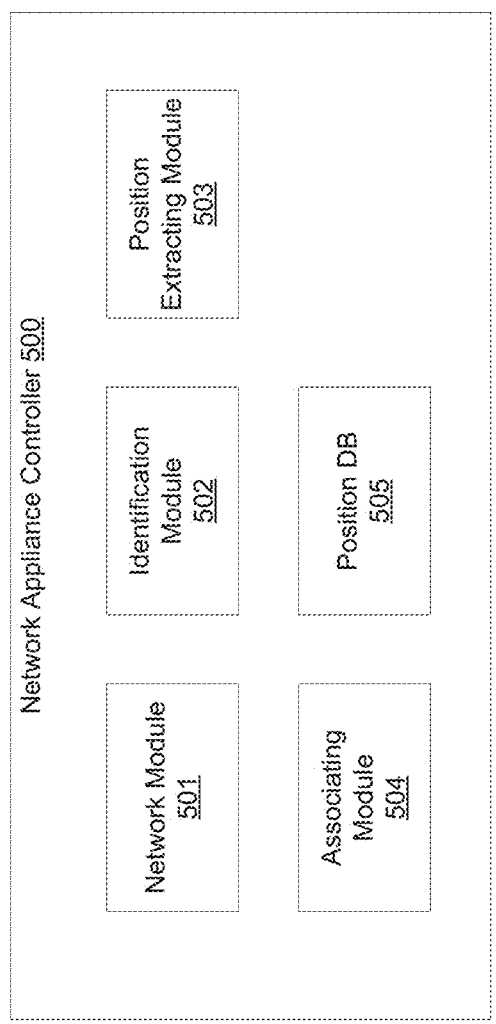
FIG. 5 illustrates exemplary functional units of a network appliance controller that makes use of position information of managed network appliances in accordance with an embodiment of the present invention.

Network module 401 is used for setting up a network connection between mobile device 400 and a network appliance controller (e.g., network appliance controller 220 and 500 of FIGS. 2 and 5, respectively). Data or media files may be transferred from mobile device 400 to the network appliance controller through the network connection. The network connection may be a VPN tunnel if mobile device 400 and the network appliance controller are connected through a public network. In some examples, network module 401 may also be used for scanning a SSID/BSSID of an AP.

Camera 402 is used for taking photos of barcode labels of network appliances managed by the network appliance controller and optical barcode reader 403 is used for scanning barcode labels of the network appliances.

In one example, identification information, e.g., a serial number and/or a MAC address, of a network appliance may be encoded as a linear barcode or a matrix barcode. The barcode may be printed on a label and the label may be placed on an external housing or case of the network appliance. In this example, identification module 404 may be a barcode decoder that is used for decoding identification information associated with network appliances from barcode images taken by camera 402 or optical barcode reader 403. Identification module 404 may include multiple decode engines for decoding different types of barcodes and identifications of network appliances encoded in various barcodes may be identified by mobile device 400.

In another example, the identification information of a network appliance may be printed on a label in textual form (without the use of a barcode). In this example, identification module 404 may include an optical character recognition (OCR) engine to recognize the text included in the image of the label taken by camera 402. The identification information of the network appliance may be retrieved by the OCR engine directly from the label placed on the case of the network appliance.

In a further example, identification information of a network appliance may be input manually by a user of mobile device 400.

In a further example, the network appliance may be an AP and an SSID or a BSSID may be broadcast by the AP. The BSSID may represent the MAC address of the AP and can be used for identifying the AP. If an SSID that is unique in the private network that is managed by the network appliance controller is assigned to the AP, then the unique SSID may be used as an identification of the AP. In this example, network module 401 may be used for scanning the BSSID or SSID broadcast by the AP. Identification module 404 may retrieve the BSSID or SSID of the AP that is scanned by network module 401. In the case of multiple BSSIDs or SSIDs being observed by network module 401, the BSSID or SSID with the strongest signal strength may be selected by identification module 404.

Positioning module 405 is used for capturing a current position of mobile device 400. In one example, positioning module 405 may be a GPS module that may capture the current position of mobile device 400 through satellite-based global positioning system. In another example, positioning module 405 may be an indoor positioning system, e.g., a power-of-arrival (PoA) based positioning system.

Management utility application 406 is a utility application that is installed on mobile device 400 for collecting identification information and deployment positions of network appliances that are managed by a network appliance controller. Mobile device 400 may be positioned proximate to (e.g., as near as possible to the place where an network appliance is deployed). Then, management utility application 406 may invoke network module 401, camera 402, optical barcode scanner 403 and identification module 404 to collect the identification information associated with a nearby network appliance. Management utility application 406 may also invoke positioning module 405 to capture the current position of mobile device 400. Then, management utility application 406 may send the identification information of the network appliance and the current position of mobile device 400 to the network appliance controller through the network connection. If the network connection is unsafe, the identification of network appliance and current position may be encrypted to prevent it from interception by a third party.

FIG. 5 illustrates exemplary functional units of a network appliance controller 500 that makes use of position information of managed network appliances in accordance with an embodiment of the present invention. In the context of the present example, network appliance controller 500 includes a network module 501, an identification module 502, a position extracting module 503, an associating module 504 and a position DB 505.

Network module 501 is used for receiving data or files from a mobile device (e.g., mobile device 140, 240 and 400 of FIGS. 1, 2 and 4, respectively). In some examples, data or media files may be transferred from the mobile device to network appliance controller 500 through a network connection. The network connection may be a VPN tunnel if the mobile device and the network appliance controller 500 are connected by way of an intermediate public network. If the data and media files received from the mobile device are encrypted, network module 501 may decrypt them according to a predetermined encrypt/decrypt method. In other examples, network module 501 may be an electronic communication tool, including, but not limited to, Email, FTP, IM tools or the like.

In one example, a digital photo of a barcode label of a network appliance is captured by the mobile device. Position information (which may also be referred to herein as shooting position information) associated with the mobile device at the time the digital photo is captured is stored (e.g., as Exif meta-data of a photo file). The digital photo of the barcode label may be sent or uploaded to network appliance controller 500 by way of a communication tool. After the photo file is received by network appliance controller 500, the photo file is scanned by an barcode decode engine of identification module 502 and the identification of network appliance is extracted from the photo. The shooting position information is extracted from meta-data of the photo file by position extracting module 503. Then, associating module 504 may associate identification information associated with the network appliance and decoded from a photo file with the position of the photo. For example, associating module 504 may verify whether the photo file is from a trustworthy source and if the identification information (e.g., a serial number and/or a MAC address), belongs to a network appliance that is managed by network appliance controller 500. If so, the shooting position of the photo may be stored within position DB 505 as the deployment position of the network appliance.

In another example, identification information of a network appliance is recognized by the mobile device and a current position is also captured by the mobile device. The identification information of the network appliance and the current position of the mobile device may be sent to network appliance controller 500 by the mobile device through a VPN connection. In this case, network appliance controller 500 does not need identification module 502 and position extracting module 503 to extract identifications and position information from photo files (as decoding of encoded identification information, if any, has already been performed by the mobile device and position information is provided directly rather than via metadata associated with a digital photo file). Associating module 504 may verify whether the identification information, such as a serial number or MAC address, belongs to a network appliance that is managed by network appliance controller 500. If so, the position of the mobile device at the time the identification information was captured by the mobile device is associated with the network appliance and is stored within position DB 505 as the deployment position of the network appliance.

Figure 6:
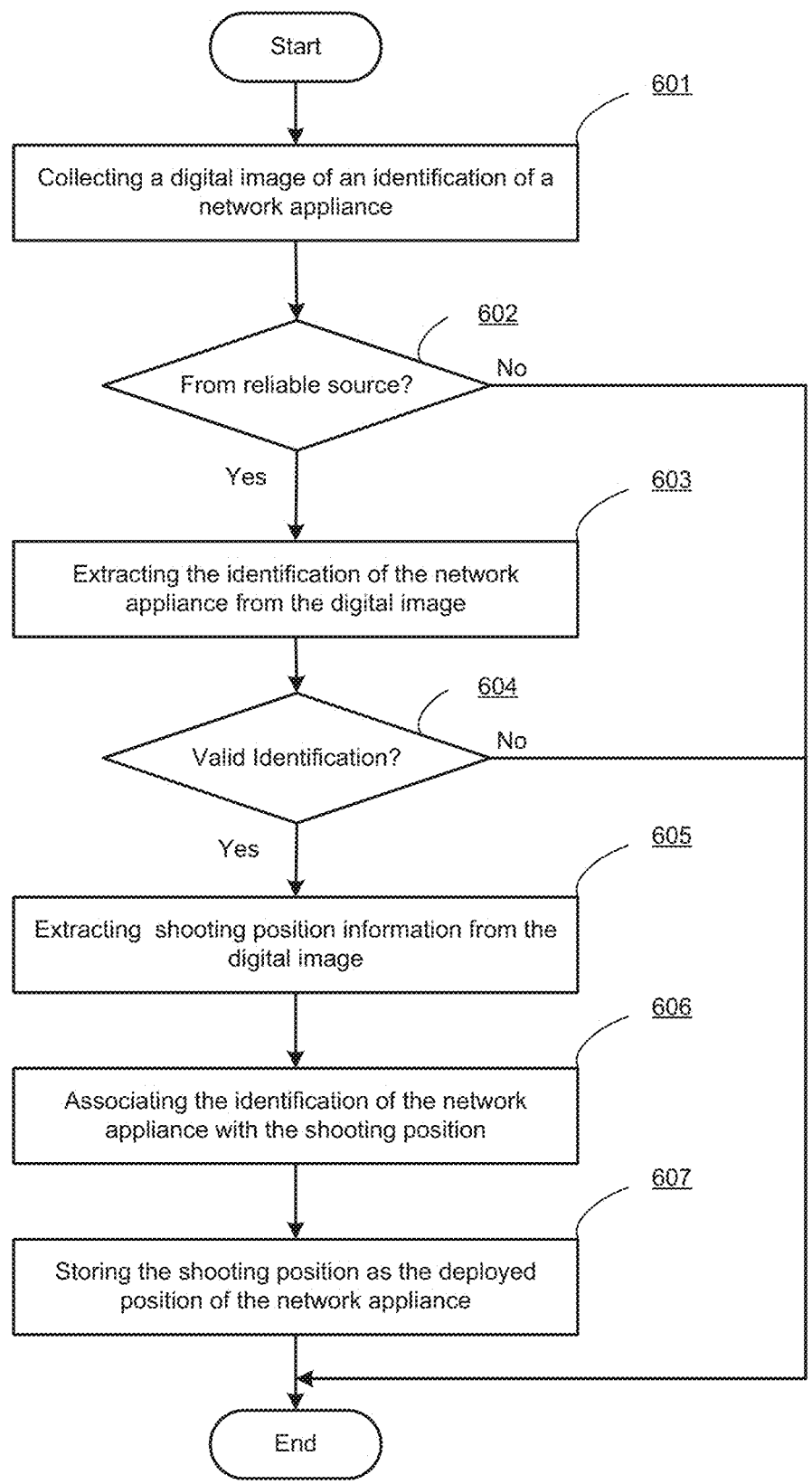
FIG. 6 is a flow diagram illustrating a method of associating collected position information with a managed network appliance in accordance with an embodiment of the present invention.

FIG. 6 is a flow diagram illustrating a method of associating collected position information with a managed network appliance in accordance with an embodiment of the present invention. In this example, a mobile device is placed in proximity to a network appliance and is used to capture a photo of a barcode label of the network appliance. The barcode label contains information identifying the network appliance, such as a serial number or a MAC address. A digital photo file is created by the mobile device and shooting position information (e.g., position information of the mobile device at the time the photo was captured) is stored within metadata (e.g., Exif meta-data) associated with the digital photo file. The digital photo file is transferred to the network appliance controller. The network appliance controller may extract the identification information of the network appliance and the shooting position information from the digital photo file and associate the identification information of the network appliance with the shooting position information as the deployment position of the network appliance.

At block 601, a digital photo file containing identification information of a network appliance is received by a network appliance controller. The digital photo file may be received through a communication tool, such as Email, FTP, HTTP browser or instant messaging through a network connection.

At block 602, the network appliance controller may verify whether the digital photo file is from a reliable/trustworthy or known source. For example, a user of the mobile device may be authenticated before the digital photo file is transferred in order to limit uploading of photos containing identification information of network appliances to one or more designated users. Further, the digital photo file may be encrypted or password-protected to prevent it from being intercepted or altered by a third party. The encrypted or password-protected digital photo file may be decrypted by the network appliance controller.

At block 603, if the digital photo file is verified as being from a reliable source, network appliance controller may extract the identification information of the network appliance from the digital photo file. For example, a barcode decode engine may scan the digital photo file and decode the barcode contained in the photo. Then, the identification information, such as the serial number or the MAC address of the network appliance, is extracted from the digital photo file.

At block 604, the identification information of the network appliance may be verified to be that of a network appliance that is managed by the network appliance controller. For example, the network appliance controller may maintain a database of serial numbers and/or MAC addresses of network appliances of a private network. If the serial number or MAC address extracted from the digital photo file can be found in the database, then the identification information may be deemed to be valid.

At block 605, shooting position information may be extracted from metadata associated with the digital photo file (e.g., Exif meta-data of the digital photo file) by the network appliance controller. The shooting position of the digital photo file may include the latitude, longitude and altitude of the mobile device at the time at which the photo was taken. The altitude may be useful for locating network appliances that are deployed in a building having multiple floors, for example.

At block 606, the network appliance controller associates the identification information of the network appliance with the shooting position of the digital photo file as the deployment position of the network appliance.

At block 607, the deployment position of the network appliance is stored within a position database or a network inventory database by the network appliance controller for later use in connection with one or more network appliance maintenance functions.

Figure 7:
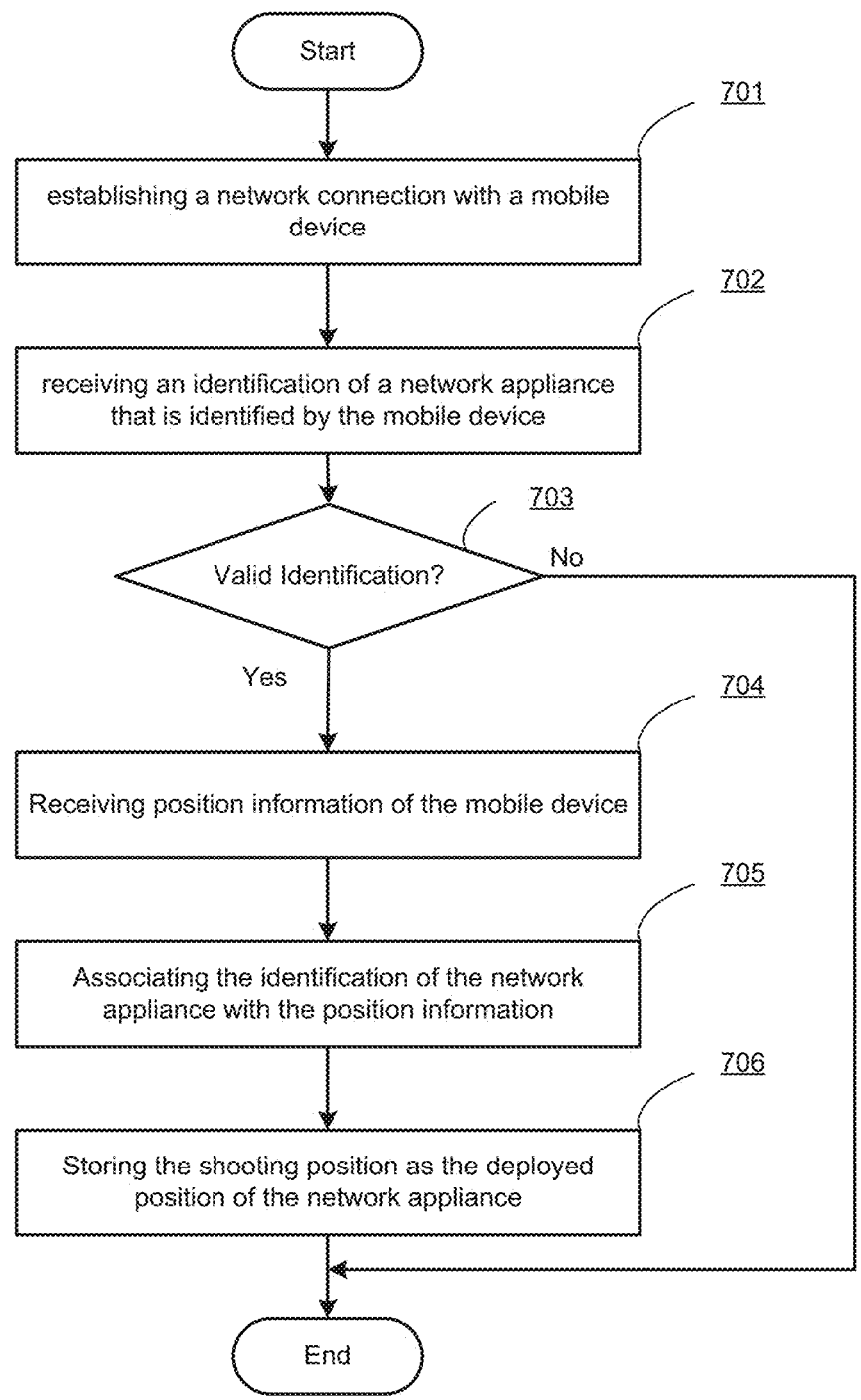
FIG. 7 is a flow diagram illustrating a method of associating collected position information with a managed network appliance in accordance with another embodiment of the present invention.

FIG. 7 is a flow diagram illustrating a method for managing position information of a network appliance by a network appliance controller in accordance with another embodiment of the present invention.

At block 701, a network appliance controller establishes a network connection with a mobile device. A VPN connection may be established if the network appliance controller connects to the mobile device through a public network. When the network connection is established, the mobile device is authenticated to ensure that data to be transferred is from an authorized source.

At block 702, the network appliance controller receives identification information of a network appliance from the mobile device over the network connection. The identification information may be a serial number and/or a MAC address of the network appliance or an SSID/BSSID of an AP. The identification information of the network appliance may be acquired by the mobile device by scanning and decoding a barcode label placed on the network appliance or by scanning a BSSID or SSID broadcast by the AP.

At block 703, the network appliance controller may verify whether the identification information is associated with a network appliance that is managed by the network appliance controller. For example, the network appliance controller may maintain a database of serial numbers and/or MAC addresses of network appliances of a private network. If the serial number and/or MAC address is found in the database, then the identification is deemed to be valid.

At block 704, the network appliance controller receives position information associated with the mobile device at the time the identification information was captured by the mobile device through the network connection. In this example, the mobile device is placed in close proximity to the network appliance and then the current position of the mobile device is captured by a position module of the mobile device concurrently with or close in time to the capture of the identification information of the network appliance. Then, the position information associated with the identification information provided at block 703 is transferred to the network appliance controller.

At block 705, the network appliance controller associates the identification information of the network appliance with the position information as the deployment position of the network appliance.

At block 706, the deployment position of the network appliance is stored within a position database or a network inventory database by the network appliance controller for later use in network appliance maintenance.

Figure 8:
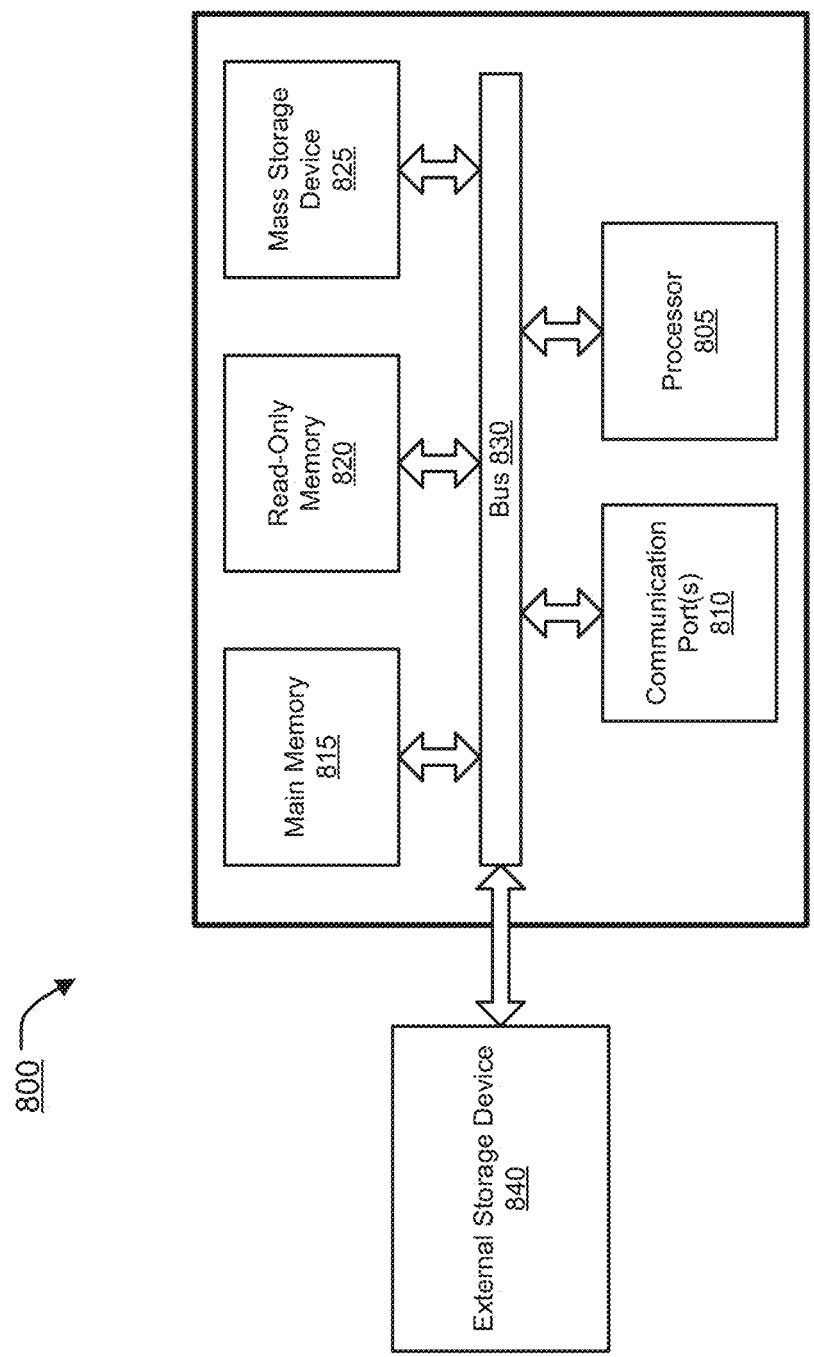
FIG. 8 is an exemplary computer system in which or with which embodiments of the present invention may be utilized.

FIG. 8 is an example of a computer system 800 with which embodiments of the present disclosure may be utilized. Computer system 800 may represent or form a part of a network appliance, a mobile device, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports.

Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with embodiments of the present invention.

Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
    receiving, by a wireless access point controller (AC) of a wireless local area network (WLAN), a digital image of a label affixed to a housing of a wireless access point (AP) of the WLAN, the digital image containing identification information associated with the AP, wherein the identification information comprises a serial number or a media access control (MAC) address of the AP;
    extracting, by the AC, the identification information from the digital image;
    extracting, by the AC, position information, identifying a location at which the digital image was taken, from the digital image;
    associating, by the AC, the identification information of the AP with the position information as a deployment position of the AP within the WLAN; and
    performing, by the AC, one or more of (i) WLAN WiFi coverage optimization, (ii) WiFi channel utilization optimization within the WLAN and (iii) triangulation of WiFi clients' locations within the WLAN based on the deployment position and deployment positions of other APs associated with the WLAN.

2. The method of claim 1, wherein the identification information is encoded by an optical machine-readable representation.

3. The method of claim 2, wherein the optical machine-readable representation comprises a linear barcode or a matrix barcode.

4. The method of claim 1, wherein the identification information is extracted from the digital image by an optical character recognition (OCR) engine of the AC.

5. The method of claim 1, wherein the identification information comprises a service set identifier (SSID) or a basic service set identifier (BSSID).

6. The method of claim 1, wherein the position information is embedded in exchangeable image file format (EXIF) data of the digital image.

7. The method of claim 1, wherein the position information comprises a global positioning system (GPS) location of a mobile device at a time when the digital image was captured by the mobile device.

8. A method comprising:
    establishing, by a wireless access point controller (AC) of a wireless local area network (WLAN), a network connection with a mobile device;
    receiving from the mobile device via the network connection, by the AC, identification information associated with a wireless access point (AP) of the WLAN, wherein the identification information is extracted from a label affixed to a housing of the AP and wherein the identification information comprises a serial number or a media access control (MAC) address of the AP;
    receiving from the mobile device via the network connection, by the AC, position information;
    associating, by the AC, the identification information with the position information as the deployment position of the AP within the WLAN; and
    performing, by the AC, one or more of (i) WLAN WiFi coverage optimization, (ii) WiFi channel utilization optimization within the WLAN and (iii) triangulation of WiFi clients' locations within the WLAN based on the deployment position and deployment positions of other APs associated with the WLAN.

9. The method of claim 8, wherein the identification information is extracted from an optical machine-readable representation by the mobile device.

10. The method of claim 8, further comprising verifying, by the AC, whether the identification information represents a valid serial number or a valid media access control (MAC) address of an AP that is managed by the AC.

11. The method of claim 8, wherein the identification information and the position information are encrypted by the mobile device prior to being transmitted to the AC via the network connection and are decrypted by the AC.

12. The method of claim 8, wherein the identification information comprises a service set identifier (SSID) or a basic service set identifier (BSSID).

13. The method of claim 12, wherein the identification information is contained within a service set identifier (SSID) or a basic service set identifier (BSSID) broadcast by the AP.

14. The method of claim 8, wherein the position information comprises a global positioning system (GPS) location of the mobile device at a time when the identification information was determined by the mobile device.

15. The method of claim 8, further comprising storing, by the AC, the position information within a position database.

* * * * *